K. H. POYAS.
COMMUTATOR WIPER.
APPLICATION FILED MAR. 23, 1918.

1,293,193.

Patented Feb. 4, 1919.

Inventor:
Karl H. Poyas,
by Hazard & Miller
Att'ys.

UNITED STATES PATENT OFFICE.

KARL H. POYAS, OF LOS ANGELES, CALIFORNIA.

COMMUTATOR-WIPER.

1,293,193.  Specification of Letters Patent.  Patented Feb. 4, 1919.

Application filed March 23, 1918. Serial No. 224,228.

*To all whom it may concern:*

Be it known that I, KARL H. POYAS, a citizen of the United States, residing at Los Angeles, in the county of Los Angeles and State of California, have invented new and useful Improvements in Commutator-Wipers, of which the following is a specification.

My object is to make a wiper for Ford commutators and my invention consists in the novel features herein shown, described and claimed.

Figure 1:
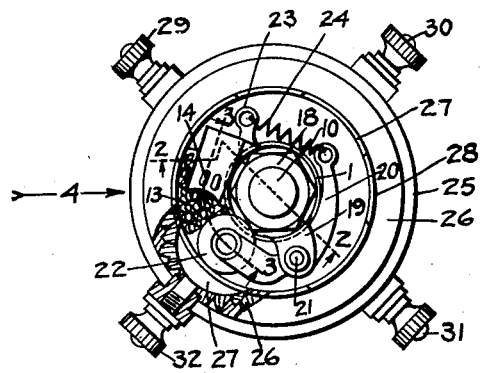
Figure 1 is a front elevation of a Ford commutator with the cap removed to show a wiper embodying the principles of my invention in position for use.
Figure 2:
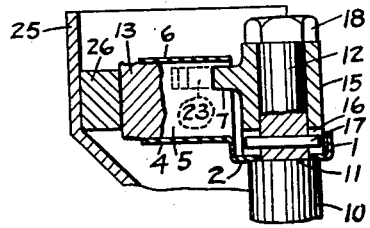
Fig. 2 is a fragmentary sectional detail on the line 2—2 of Fig. 1.
Figure 3:
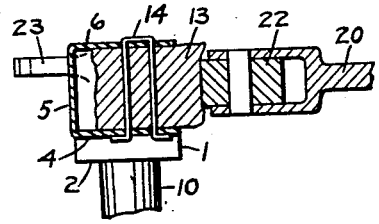
Fig. 3 is a fragmentary sectional detail on the line 3—3 of Fig. 1.
Figure 4:
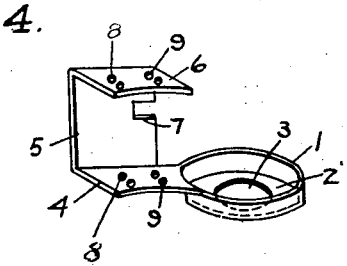
Fig. 4 is a perspective of the wiper frame removed from the commutator and with the wiping element removed from the frame.

The wiper frame shown in Fig. 4 comprises a circular band 1, an annular flange 2 extending inwardly from one end of the band and having a central opening 3, a flat plate 4 extending from the other end of the band 1, a second flat plate 5 extending from one edge of the plate 4, and a third flat plate 6 extending from the other edge of the plate 5, the plates 4 and 6 being parallel and the plate 5 having a notch 7 in one edge and there being perforations 8 and 9 in the plates 4 and 6.

The cam shaft 10 has a shoulder 11 and a pintle 12 extending one way from the shoulder.

The wiper element 13, preferably of felt, is placed between the plates 4 and 6 against the plate 5 and secured in place by staples 14 inserted through the perforations 8 and 9 and through the wiper element. The wiper thus constructed is placed in position with the pintle 12 extending through the opening 3 of the flange 2 bearing against the shoulder 11. The commutator head 15 has notches 16 in its lower end. A pin 17 is inserted through the pintle, the head 15 is placed upon the pintle 12 with the ends of the pin 17 in the notches 16, and the nut 18 is applied to the end of the pintle 12 to hold the head 15 in place, and when the nut is screwed down tight the head 15 is held to rotate with the cam shaft 10 and the flange 2 is pinched between the end of the head 15 and the shoulder 11. A bifurcated bearing 19 extends from the head 15. The commutator roller arm 20 is pivotally connected in the bifurcation of the bearing 19 upon a pin 21. The roller 22 is carried by the roller arm 20. An arm 23 projects from the opposite side of the head 15 from the bearing 19 and fits in the notch 7. A retractile coil spring 24 connects the arm 20 to the arm 23 to force the roller 22 yieldingly outwardly.

The stationary casing 25 is mounted concentric to the cam shaft 10. A fiber insulating ring 26 is mounted inside of the casing and contact plates 27 are embedded into the inner face of the insulation ring 26 and the roller 22 bears upon the contact plates 27. The inner face 28 of the insulation and contact plates is turned smooth and the roller 22 travels against this face. The wiper element 13 bears against the face 28 and against the face of the roller 22, so that as the cam shaft 10 rotates the face 28 and the face of the roller are wiped and kept clean so as to make good contacts and so as to run smoothly without heating. The wires to the spark plugs are connected to the binding posts 29, 30, 31 and 32.

When it is desired to change the wiper element 13 the nut 18 is removed, the head 15 removed, and then the wiper removed. The staples 14 may be removed and a new element supplied.

Various changes may be made in the details of construction without departing from the spirit of my invention as claimed.

I claim:

1. A commutator wiper comprising an annular band, a flange extending inwardly from one end of the band and having a central opening, a plate extending outwardly from the other end of the band, a second plate extending from the first plate at right angles, a third plate extending from the second plate at right angles; the first and third plates being parallel; a wiper element placed between the first and third plates against the second plate, and staples securing the wiper element in place.

2. The combination with a commutator having a cam shaft, annular contact plates and insulation ring, and a roller connected to the cam shaft and spring pressed against the annular contact plates and insulation ring, of a commutator wiper comprising an annular band, a flange extending inwardly from one end of the band and having a central opening fitting the cam shaft, a frame extending from the other end of the annular band, and a wiper element mounted in the frame and adapted to engage the commutator roller and the annular contact plates and insulation ring.

In testimony whereof I have signed my name to this specification.

KARL H. POYAS.